United States Patent [19]

Harada et al.

[11] Patent Number: 4,744,745
[45] Date of Patent: * May 17, 1988

[54] VARIABLE CONTOUR RUBBER EXTRUDER

[75] Inventors: Jumei Harada; Takashi Yokoi, both of Tokyo; Keiji Yamamoto, Kuroiso, all of Japan

[73] Assignee: Bridgestone Corporation, Tokyo, Japan

[ * ] Notice: The portion of the term of this patent subsequent to Mar. 18, 2003 has been disclaimed.

[21] Appl. No.: 862,948

[22] Filed: May 14, 1986

[30] Foreign Application Priority Data

May 14, 1985 [JP] Japan ................... 60-100395

[51] Int. Cl.[4] .............................. B29C 47/32
[52] U.S. Cl. .................... 425/466; 425/374; 425/376 B; 425/381
[58] Field of Search ............ 425/466, 374, 376 R, 425/376 A, 376 B, 461, 467, 380, 381; 264/176.1

[56] References Cited

U.S. PATENT DOCUMENTS

| | | | |
|---|---|---|---|
| 1,350,722 | 8/1920 | Goodenberger | 425/466 |
| 1,715,859 | 6/1929 | Norton | 425/376 A X |
| 3,093,860 | 6/1963 | Eilersen | 425/466 X |
| 3,112,527 | 12/1963 | Pankratz et al. | 425/466 |
| 3,142,091 | 7/1964 | Curtiss | 425/374 X |
| 3,145,419 | 8/1964 | Reifenhauser | 425/376 A X |
| 3,195,183 | 7/1965 | Phillips | 425/466 |
| 3,871,810 | 3/1975 | Geyer | 425/374 |
| 4,174,200 | 11/1979 | Hoj | 425/376 A |
| 4,470,790 | 9/1984 | Harada et al. | 425/466 X |
| 4,576,563 | 3/1986 | Harada et al. | 425/376 BX |

FOREIGN PATENT DOCUMENTS 120022 8/1983 Japan .

*Primary Examiner*—Richard L. Chiesa
*Attorney, Agent, or Firm*—Sughrue, Mion, Zinn, Macpeak & Seas

[57] ABSTRACT

A variable contour rubber extruder comprises a rotary driving roller, a main body forming therein an eccentric arc chamber with the rotary driving roller, and a movable mouth piece forming with a barrel surface of the rotary driving roller an opening of variable sectional area for extruding rubber material. The movable mouth piece comprises a center piece movable toward and away from the barrel surface of the rotary driving roller and a pair of side pieces overlapping the center piece and slidably adjustable in directions in parallel with an axis of the rotary driving roller.

5 Claims, 3 Drawing Sheets

FIG_6
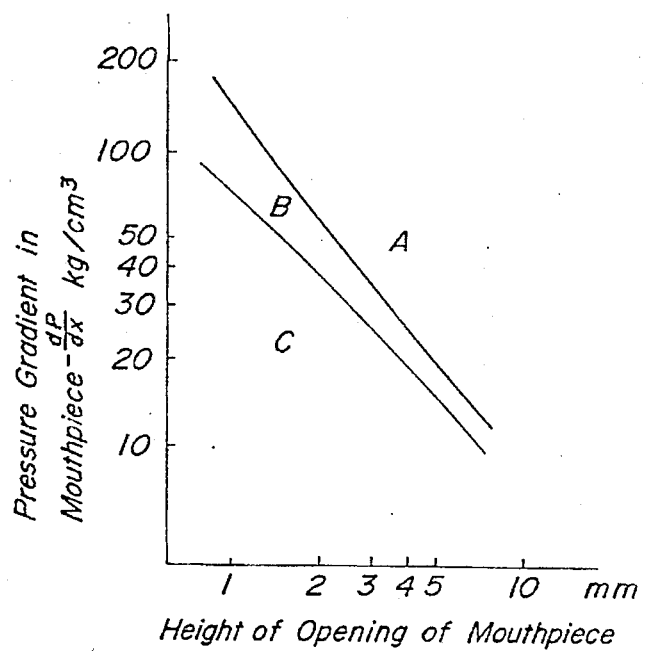

VARIABLE CONTOUR RUBBER EXTRUDER

BACKGROUND OF THE INVENTION

This invention relates to a variable contour rubber extruder for continuously extruding rubber having compositions for various uses through a mouth piece into belts and more particularly to a rubber extruder capable of varying cross-section of a mouth piece to obtain particular contours of extruded rubber meeting with various kinds of tires.

A variable mouth piece of a rubber extruder suitable for extruding different tread rubbers for various kinds of tires has been disclosed in, for example, Japanese Laid-open Utility Model Application No. 58-120,022. With this variable mouth piece, sectional curves of its desired contour are approximately designated by polygonal lines to eliminate defects in forming and vulcanizing processes such as creases, bares or light spots or inclusion of air which would occur in prior art stepwise designated curves of mouth pieces. On the other hand, however, the mouth piece designated by polygonal lines encounters a new problem in that contours of extruded rubber would deform at the opening of the mouth piece due to swelling effect uneven in the width direction resulting from a difference in thickness of the contours, so that required contours after water cooling cannot be obtained.

SUMMARY OF THE INVENTION

It is an object of the invention to provide an imporved variable contour rubber extruder capable of stably producing rubber contours which are substantially coincident with an opening of a mouth piece by effectively restraining the swelling in width directions of extruded rubber.

In order to achieve this object, according to the invention a variable contour rubber extruder comprises a rotary driving roller, a main body forming therein an eccentric arc chamber with said rotary driving roller, and a movable mouth piece forming with a barrel surface of said rotary driving roller an opening of variable sectional area for extruding rubber material.

This invention resides in the discovery that extruded rubber is scarcely subjected to the swelling effect (regaining of viscoelastic compressive deformation of rubber due to extruding force through a mouth piece opening) even if lengths of edges of the opening in width directions of the rubber are different, by directly defining the opening by a barrel surface of a rotary driving roll rotating in extruding directions.

In a preferred embodiment of the invention, the movable mouth piece comprises a center piece movable toward and away from said barrel surface of the rotary driving roller and a pair of side pieces overlapping the center piece and slidably adjustable in directions in parallel with an axis of the rotary driving roller.

In a further embodiment, the movable mouth piece comprises a number of sliders adjustable toward and away from the barrel surface of the roller and a number of links overlapping adjacent links and pivotally connected to one ends of respective sliders.

In a preferred embodiment, the eccentric arc chamber of the main body is constructed such that with the rubber material being suplied with the same rubber material commensurate with amounts of the material extruded from the mouth piece, pressure gradients at the mouth piece in extruding the rubber material having thicknesses of 1–5 mm are within a quadrilateral area having four corners. The corners correspond to pressure gradients 65 and 150 (kg/cm$^3$) at the mouth piece for extruding 1 mm thickness rubber and pressure gradients 11 and 23 (kg/cm$^3$) at the mouth piece for extruding 5 mm thickness rubber in a graph having an ordinate in logarithm showing the pressure gradients and an abscissa in logarithm shown thicknesses (mm) of extruded rubber.

In order that the invention may be more clearly understood, preferred embodiments will be described, by way of example, with reference to the accompanying drawings.

BRIEF DESCRIPTION OF THE DRAWINGS

FIG. 6 is a graph illustrating the logarithmic relationship between pressure gradient at the mouth piece and thickness of extruded rubber.

DESCRIPTION OF THE PREFERRED EMBODIMENT

Figure 1:
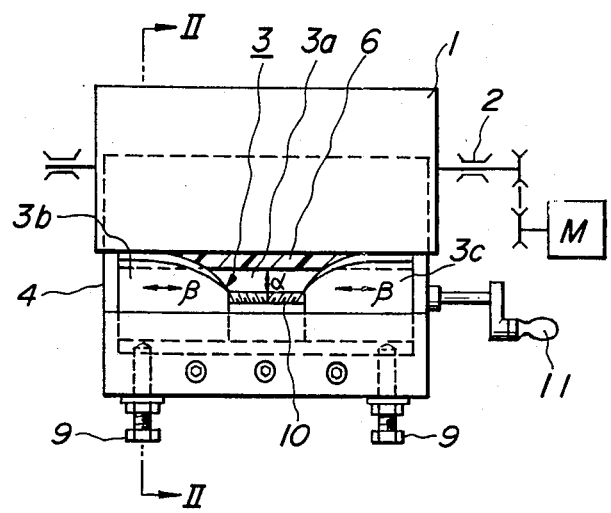
FIG. 1 is a front view of an extruder according to the invention.

FIG. 1 schematically illustrates a behavior of inner liner rubber extruded from an extruder according to the invention. The extruder comprises a rotary driving roller 1 journalled by bearings 2 and a movable mouth piece 3 consisting of a center piece 3a and a pair of side pieces 3b and 3c. The extruder further comprises a main body 4 and guide rollers 5 for extruded contour rubber belt 6.

In this embodiment, the center piece 3a is mounted in the main body 4 movably upward and downward in directions shown by α relative thereto or adjustably toward and away from the rotary driving roller 1. The side pieces 3b and 3c are also mounted in the main body 4 overlapping the center piece 3a and slidably adjustably along a surface of the rotary driving roller 1 in directions shown by arrows β in parallel with the axial directions of the rotary driving roller 1.

The maximum thickness of the extruded contour rubber 6 is determined by the center piece 3a, while the width of the rubber is determined by the side pieces 3b and 3c serving to narrowing a clearance between the center piece 3a and the roller 1 toward both ends thereof until outer ends of the side pieces 3b and 3c are in contact with the roller 1.

There are differences in length of upper surfaces between the center piece 3a and the side pieces 3b and 3c overlapping the center piece 3a in the direction of the flowing rubber. Accordingly, if the rubber is extruded through an extruding opening formed by such mouth pieces 3a, 3b and 3c and a fixed mouth piece (not shown) instead of the rotary roller 1 or a simple screw-type extruder, it is difficult to obtain a predetermined contour of the rubber because of increase in thickness of the rubber at the overlapping portions of the mouth pieces owing to swelling due to the difference in length in the direction of the flowing rubber.

In contrast herewith, so long as a rotary roller type extruder having a rotary driving roller 1 and a main body 4 formed with an eccentric arc chamber 7 for accommodating therein rubber blank 8 to utilize as extruding force the frictional force between the roller 1 and the rubber or an extruder with a roller die is used, the swelling effect is remarkably reduced to obtain an extruded contour rubber 6 passing through an extruding opening defined by the mouth pieces 3a, 3b and 3c and the rotary driving roller 1 and having thicknesses directly corresponding to the extruding opening.

Figure 2:
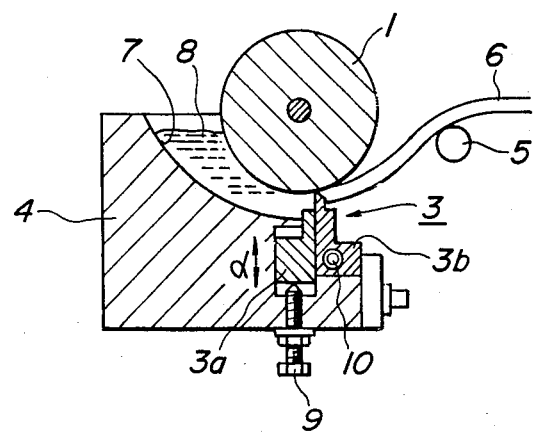
FIG. 2 is a sectional view taken along the line II—II in FIG. 1.

In FIGS. 1 and 2, set screws 9 serve to set the center piece 3a with respect to the rotary driving roller 1. The side pieces 3b and 3c are moved toward and away from each other to determine a width of the extruded rubber by a handle 11 driving a feeding screw 10 formed on halves with right and left hand screw threads.

Figure 3:
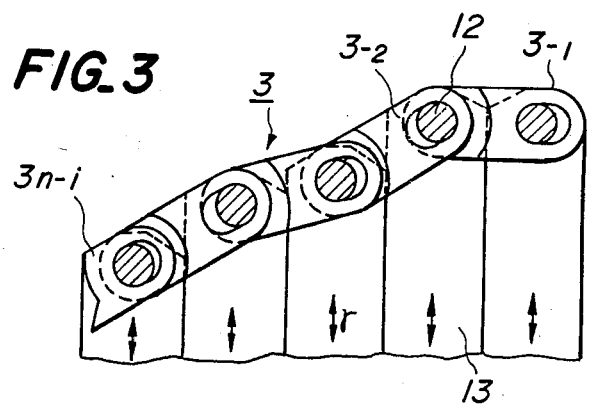
FIG. 3 is a partial view illustrating a movable mouth piece of another embodiment of the invention.
Figure 4:
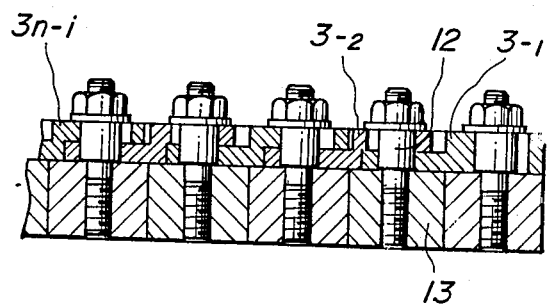
FIG. 4 is a partial sectional view of the mouth piece shown in FIG. 3.

As an alternative, the movable mouth piece 3 may have a configuration comprising polygonal lines approximately similar to the desired shape as shown in FIG. 3, according to the disclosure of the Japanese Laid-open Utility Model Application No. 58-120,022. One example as shown in FIGS. 3 and 4 comprises a number of loose links 3-1, 3-2, . . . 3-n pivotally connected to each other and connected to respective sliders 13 by means of reamer bolts 12, so that upper edges of the loose links 3-1 to 3-n are adjustable relative to a rotary driving roller so as to change clearances therebetween to define the contour of the rubber.

With any movable mouth pieces above described, an eccentric arc chamber 7 of a main body is preferably formed so as to cause pressure gradients within a quadrilateral formed by connecting four points of pressure gradients 65 and 150 kg/cm³ at the mouth piece for extruding 1 mm rubber and 11 and 23 kg/cm³ for extruding 5 mm on a logarithmic graph whose ordinate designates pressure gradient and abscissa designates thicknesses of extruded rubber when the extruder is being supplied with blank rubber commensurate with the flowing rubber out of the extruder. This relationship is illustrated in FIG. 6. That Fig. corresponds to FIG. 5 of U.S. Pat. No. 4,576,564 (commonly assigned) and shows suitable and unsuitable extruding conditions that are dependent on the heights of openings of mouth pieces as a function of pressure gradient.

In causing such extruding pressures, the object of the present invention can be accomplished by applying the above movable mouth piece to a so-called single roller die, for example, disclosed in U.S. Pat. No. 3,871,810.

According to the invention, the rubber extruding opening is formed between a barrel surface of the rotary driving roller and a movable assembled mouth piece comprising polygonal lines forming an opening approximate to a desired mouth piece opening. With this arrangement, the swelling effect at the exit of the movable mouth piece is advantageously restrained with a longer contacting length along the barrel surface of the rotary driving roller, although there is the difference in contacting length of the overlapping portions of the mouth piece in the extruding direction.

Figure 5:
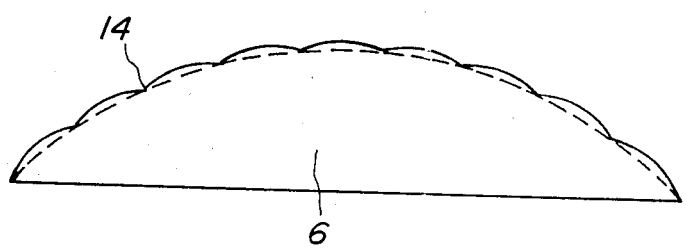
FIG. 5 is a schematic view of a profile of extruded rubber.

When the movable mouth piece as shown in FIGS. 3 and 4 is used for a screw-type extruder of the prior art, recesses 14 like stripes as shown in solid lines in FIG. 5 resulting from the swelling effect of the movable mouth piece 3 have not been prevented. On the other hand, when the similar movable mouth piece 3 is used together with the rotary driving roll 1 as a pressure source according to the invention, the extruded rubber having a smoothly continuous curved contour profile is obtained as shown in FIG. 5.

As can be seen from the above description, the invention can eliminate the disturbance in profile of extruded rubber contour which have unavoidably occurred in extruding rubber by fixed extruding openings.

It is further understood by those skilled in the art that the foregoing description is that of preferred embodiments of the disclosed extruder and that various changes and modifications may be made in the invention without departing from the spirit and scope thereof.

What is claimed is:

1. A variable contour rubber extruder comprising a rotary driving roller, a main body forming therein an eccentric arc chamber with said rotary driving roller, a movable mouth piece forming with a barrel surface of said rotary driving roller an opening of variable sectional area for extruding rubber material, said eccentric arc chamber of said main body constructed such that with said rubber material being supplied with the same rubber material commensurate with amounts of the material extruded from said mouth piece, pressure gradients at the mouth piece in extruding the rubber material having thicknesses of 1–5 mm are within a qualrilateral area having four corners, said corners corresponding to pressure gradients 65 and 150 (kg/cm³) at the mouth piece for extruding 1 mm thickness rubber and pressure gradients 11 and 23 (kg/cm³) at the mouth piece for extruding 5 mm thickness rubber in a graph having an ordinate in logarithm showing the pressure gradients and an abscissa in logarithm showing thicknesses (mm) of extruded rubber.

2. An extruder as set forth in claim 1, wherein said movable mouth piece comprises a center piece movable toward and away from said barrel surface of said rotary driving roller and a pair of side pieces overlapping said center piece and slidably adjustable in directions in parallel with an axis of said rotary driving roller.

3. An extruder as set forth in claim 2, wherein said center piece is arranged to determine a maximum thickness of an extruded contour rubber and said side pieces are arranged to narrow a clearance between the center peice and said barrel surface of said rotary driving roller toward both ends of the roller.

4. An extruder as set forth in claim 3, wherein said side pieces are moved toward and away from each other to determine a width of the rubber by a handle for driving a feeding screw formed on halves with right and left hand screw threads.

5. An extruder as set forth in claim 1, wherein said movable mouth piece comprises a number of sliders adjustable toward and away from said barrel surface of the roller and a number of links overlapping adjacent links and pivotally connected to one of the ends of respective sliders.

* * * * *